United States Patent Office 3,046,223
Patented July 24, 1962

3,046,223
METHOD OF LUBRICATING METAL PARTS EXPOSED TO NUCLEAR RADIATION AND HOT CARBON DIOXIDE
Arthur L. Morris, Didcot, England, assignor to Esso Research and Engineering Company, a corporation of Delaware
No Drawing. Filed Mar. 28, 1960, Ser. No. 17,756
Claims priority, application Great Britain Apr. 9, 1959
2 Claims. (Cl. 252—27)

The present invention relates to greases which are resistant to heat and to the effects of hot carbon dioxide, and which are suitable for use in lubricating moving parts associated with nuclear reactors.

Nuclear reactors for power stations comprise a nuclear reactor zone, a heat transfer medium, and a control mechanism to prevent a temperature run-away due to uninhibited nuclear transformation within the reactor zone. The nuclear reactor zone generates neutron fluxes of a high intensity by the transformation of uranium fuel into radiation and different forms of matter, the transformation being accompanied by substantial amounts of heat. The heat-transfer medium in many plants now being built consists of carbon dioxide, which transfers heat from the reaction zone to steam-raising plants. In such installations the carbon dioxide reaches high temperatures, e.g. of the order of 400° C., the hot carbon dioxide being circulated by fans. The nuclear transformation process is kept at a desired level by a graphite moderator in which the uranium fuel rods are contained, the level of activity being capable of variation by the movement of control rods into the moderator. Such control rods are made of a material capable of absorbing neutrons, such as boron steel. The control rods are operated by a mechanism whereby they can be lowered by gravity into the reactor zone. Besides the general day-to-day movement of the control rod mechanism, the mechanism must be capable of freely-operating in an emergency quickly to drop the control rods entirely within the reactor block, and thus must be adequately lubricated. Further, the fuel cans are manipulated by a charge-discharge apparatus, which may be placed beneath the moderator block, or may be a crane mechanism situated above the moderator block.

Both the fuel can charge-discharge and the control rod mechanisms are subject to radiation, due to their proximity to the main reactor zone within the so-called biological shield although the radiation intensity to which the control-rod mechanism is subjected is somewhat less than that experienced by the charge-discharge apparatus. Both may be subject to the influence of hot carbon dioxide gas, and both must be kept lubricated during long periods when they are not accessible. Thus the grease used for such lubrication must be resistant to the effects of radiation and hot carbon dioxide gas, must not become thin at high temperatures and must be structurally stable, i.e. they must not bleed. This structural stability is of considerable importance.

The present invention is directed to greases which are resistant to the effects of hot carbon-dioxide-containing gas, and which are suitable for use in nuclear reactors of the kind described and which are also structurally and viscosity stable under operating conditions in such reactors.

The present invention therefore comprises a grease composition comprising a base mineral oil thickened to a grease consistency with carbon black, and which contains one or more natural petroleum resins.

The carbon black thickener is preferably acetylene black, but other carbon blacks may be employed. The amount of the petroleum resins used shall be sufficient to increase the viscosity of the base oil to at least about 40 cs./210° F. The total amount of the petroleum resin in the grease composition may be up to 55 weight percent, amounts of 5 to 50 weight percent being preferred, 10 weight percent to 20 weight percent being particularly preferred.

The petroleum resins employed in the compositions of the present invention should preferably have a viscosity of 1500 to 4000 cs. at 210° F. a range of 2000 to 3000 cs. at 210° F. being particularly preferred.

The natural petroleum resins used in the compositions of the present invention are well-known products of the petroleum industry. They are concentrated in the residua from resin-containing crudes, such residua being obtained from distillation processes, or obtained by solvent treatment processes, particularly as hereinafter described. The natural petroleum resins are characterised by low Holde asphalt contents usually less than 0.2, and a high proportion of acetone-insoluble matter.

Resin-containing crudes are well-known in the petroleum industry. The most useful crudes from which resins for the present invention may be obtained are paraffinic non-asphaltic crudes. The residua obtained, for example by precipitation, from such crudes, do not contain associated asphalt, and are extremely potent. Particularly preferred crudes of the above type are Pennsylvania and Schoonbeck crudes.

Resins may also be obtained from mixed base crudes, such as Middle East, e.g. Kuwait crudes. The residua obtained from such crudes are associated with varying degrees of asphalt, and if such residua are subjected to decolourizing treatments with adsorbents, some loss of potency may result, an effect which does not occur with the preferred paraffinic non-asphaltic crudes mentioned above.

An example of a crude which does not contain resins in significant amounts is Quiri-quiri.

The natural resins obtained from resin-containing crudes may conveniently be incorporated into the greases, according to the present invention, in the form of concentrates contained in residua. It is preferable that such residua be decolourized, for instance with adsorbent agents conventionally used in the petroleum industry, particularly with activated charcoal, carbon black, fuller's earth, montmorillanite or other active clays. Decolourization may also be effected with a light hydrogenation treatment, such as obtained with petroleum hydrofining processes. The residua obtained from paraffinic non-asphaltic crudes may be considered as consisting almost entirely of natural petroleum resins, and such resins are the preferred resins used in the compositions of the present invention.

Base oils suitable for formulating the compositions of the present invention include both paraffinic and aromatic base mineral oils. Mineral oils containing aromatics may be employed with advantage as the amount of radiation exposure a mineral oil can tolerate increases with the aromatic content of the oil.

Whenever possible, grease formulations according to the present invention should contain as little sulphur as possible, to avoid contamination of metal parts such as fuel-rod containers, used in the nuclear reaction zone. Thus the sulphur content of the finished grease should preferably be below 1.0% by weight, particularly below 0.50%. Thus the base oil itself should have as low a sulphur content as possible.

It is also preferred that greases according to the present invention contain a minor proportion of an anti-oxidant, such as the well-known mineral oil anti-oxidants phenyl-naphthylamine, N,N'-di-secondary butyl-p-phenylene diamine, 2:4 dimethyl-6-tertiary-butyl phenol, 2:6 di-tertiary-butyl-4-methyl phenol, bis phenols and phenothiazine. Such anti-oxidants may be present in proportions of about 1% based on the total weight of the grease.

The grease composition of the present invention may be prepared by dissolving the resin in the oil with warming if necessary anti-oxidants if employed are also added at this stage. The mixture is then slowly added to the carbon black in a kettle at such a rate so as to ensure a smooth gel, the mixture being stirred continuously.

The natural petroleum resins used in the compositions of the present invention do not have a structure which is precisely determined at the present. They are stringy semi-solid brown substances which are precipitated along with asphaltene by conventional solvents such as those used in propane de-asphalting processes. Previously natural petroleum resins have been solvent separated from asphaltenes with some difficulty. Thus if separation is attempted using acetone alone, the acetone dissolves a considerable quantity of the oil containing the resins.

The natural petroleum resins used in the compositions of the present invention may be conveniently obtained from oils containing them, e.g. residua, by a two stage precipitation process. In the first instance, the oil is contacted with a paraffinic hydrocarbon or hydrocarbon mixture boiling between 0° C. and 100° C. The preferred hydrocarbon for this stage is N- or iso-pentane, although a hydrocarbon mixing consisting predominantly of pentane would be equally preferred, such as the 30/40 cut of distillate oils. As a result of the first solvent-treat, a precipitate is produced comprising asphaltenes, which are removed from the oil. The oil is then further treated with a mixed solvent comprising a paraffinic hydrocarbon or hydrocarbon mixture boiling between 0° C. and 100° C. and either a $C_1$–$C_4$ alcohol, or a $C_3$–$C_5$ ketone or the $C_1$–$C_4$ ester of a $C_1$–$C_4$ carboxylic acid, and preferably the methyl ester thereof, whereby the petroleum resins are precipitated from the oil and removed therefrom. As a matter of expediency, it is preferred that the hydrocarbon component of the second solvent is the same as that used for the first solvent. In which instance, the first solvent may either be completely flashed off the oil being treated before adding the mixture comprising the second solvent, or the first solvent may be partially flashed off the oil after precipitation of the asphaltenes therefrom, and the alcohol or carboxylic acid comprising the second solvent treating stage added to the solution.

The preferred alcohol used in the second solvent-treating stage is n-propyl alcohol, and the preferred ester is methyl acetate.

The solvent in the second solvent-treating stage should preferably comprise between 1% and 90% by weight preferably between 10% and 50% by weight of the hydrocarbon.

The solvents used in the first and second solvent stages should preferably be used in amounts between a ratio of 1 and 30, particularly between 5 and 15, by weight, of the petroleum oil, e.g. residuum, containing the resin.

The extractions should preferably be carried out at ambient temperatures.

The following examples show the increase in structural stability obtained with the grease compositions of this invention, containing a proportion of a Pennzoil resin which is a natural petroleum resin obtained from a Pennsylvania crude oil. The Pennzoil resin had a viscosity of 2600 cs. at 210° F.

The grease compositions were prepared by dissolving the Pennzoil resin and the phenyl-β-naphthyl amine in the base oil at about 100° C. The mixture was then added slowly to the carbon black with stirring which was continued after addition of the mixture. All the greases prepared had Drop Points above 250° C.

The high temperature stability of the greases was tested in the ASTM 1263 Wheel Bearing Test which was run for 8 hours at 150° C. The results were as follows:

| Grease: | Wheel bearing test oil leakage (gms.) |
|---|---|
| 1 | 0.3 |
| 2 | 0.8 |
| 3 | 0.9 |
| 4 | 1.4 |
| 5 | 0.2 |
| 6 | 1.4 |

It will be seen from the above figures that a marked reduction was obtained in the greases according to the present invention (greases 1, 3 and 5).

The greases were subjected to radiation and their stability after such exposure was measured by their penetration (mm./10).

| Grease | Micropenetration (mm./10) after— | | |
|---|---|---|---|
| | 0 rads | $10^3$ rads | $10^8$ rads |
| 1 | 108 | 109 | 144 |
| 2 | 120 | 128 | 157 |
| 3 | 113 | 116 | |
| 4 | 114 | 119 | |
| 5 | 118 | 125 | |
| 6 | 135 | 145 | |

It will be seen that the physical properties of the greases according to the present invention (1, 3 and 5) were substantially maintained whereas those greases which contained no Pennzoil resin (2, 4 and 6) had their physical characteristics altered to a greater degree.

The greases were then tested for structural stability by an oil separation test in which samples of the grease were placed in a gauge cone and suspended in a beaker for 100 hours, a temperature of 150° C. being maintained. The following results were obtained:

| Grease: | Oil separation wt. percent |
|---|---|
| 1 | 1.4 |
| 2 | 3.3 |
| 3 | 1.7 |
| 4 | 2.9 |
| 5 | 1.6 |
| 6 | 3.5 |

From the above results it can be seen that the greases according to the present invention (1, 3 and 5) are substantially superior in structural stability to the greases containing no Pennzoil resin (2, 4 and 6).

Finally the greases were tested for storage stability by storage of the greases in tins at ambient temperatures for 12 months. The following was observed.

| Base Oil | Viscosity, cs./210° F. | Composition, Wt. Percent | | | | | |
|---|---|---|---|---|---|---|---|
| | | Grease 1[1] | Grease 2 | Grease 3[1] | Grease 4 | Grease 5[1] | Grease 6 |
| Paraffinic Brightstock | 32.5 | 67.7 | 77.1 | | | | |
| Naphthenic Brightstock | 41.4 | | | 69.0 | 78.4 | | |
| Naphthenic Distillate | 14.2 | | | | | 46.1 | 79.6 |
| Pennzoil Resin | | 8.2 | | 8.2 | | 29.8 | |
| Acetylene Black | | 23.2 | 22.0 | 21.9 | 20.7 | 23.2 | 19.5 |
| Phenyl-β-naphthyl amine | | 0.9 | 0.9 | 0.9 | 0.9 | 0.9 | 0.9 |

[1] Composition according to this invention.

| Grease: | Oil separation |
|---|---|
| 1 | Nil. |
| 2 | Moderate. |
| 3 | Nil. |
| 4 | Nil. |
| 5 | Nil. |
| 6 | Trace. |

It will be noted from the above that the greases according to the present invention may be stored for long periods of time without any separation of oil.

Summarising the above data, it can be seen that carbon black thickened greases containing Pennzoil resins answer the requirements of greases for use in nuclear reactors i.e. they have good high temperature stability and that they substantially maintain their physical properties after exposure to radiation.

What is claimed is:

1. A method of lubricating rubbing metal parts associated with nuclear reactors and exposed to nuclear radiation and hot carbon dioxide gas which comprises applying to said parts a radiation resistant lubricating grease composition having less than 1 wt. percent sulfur, said composition comprising a major amount of a base stock having a viscosity of at least 40 cs. at 210° F. and a grease thickening amount of carbon black, wherein said base stock consists essentially of mineral lubricating oil and petroleum resin having a viscosity of 1,500 to 4,000 cs. at 210° F., and wherein the amount of petroleum resin is about 5 to 50 wt. percent based on the weight of the total grease composition.

2. A method according to claim 1, wherein the amount of petroleum resin is about 10 to 20 wt. percent, wherein said resin is a propane precipitated petroleum resin having a viscosity of 2,000 to 3,000 cs. at 210° F., wherein said carbon black is acetylene black and wherein said composition contains an oxidation inhibiting amount of an antioxidant, the total sulfur content of said grease being below 0.5% by weight.

References Cited in the file of this patent

UNITED STATES PATENTS

| 2,477,311 | Morway | July 26, 1949 |
| 2,696,469 | O'Halloran | Dec. 7, 1954 |
| 2,754,267 | Bondi | July 10, 1956 |